United States Patent
Bachelard et al.

[11] Patent Number: 5,688,730
[45] Date of Patent: Nov. 18, 1997

[54] OPTICALLY TRANSPARENT GAMMA-ALUMINUM OXYNITRIDE POWDERS AND CERAMIC ARTICLES SHAPED THEREFROM

[75] Inventors: Roland Bachelard; Jean-Pierre Disson, both of Lyons; Bruno Morlhon, Villeurbanne, all of France

[73] Assignee: Elf Atochem S.A., Puteaux, France

[21] Appl. No.: 683,874

[22] Filed: Jul. 19, 1996

Related U.S. Application Data

[63] Continuation of Ser. No. 220,268, Mar. 30, 1994, abandoned.

[30] Foreign Application Priority Data

Mar. 30, 1993 [FR] France ................................ 93 03718

[51] Int. Cl.$^6$ ...................... C04B 35/581; C04B 35/582
[52] U.S. Cl. ................. 501/96; 501/80; 501/127; 501/153; 501/904; 501/905; 423/385; 423/675; 423/631
[58] Field of Search ............... 501/96, 153, 904, 501/80, 127, 905; 264/65; 423/385, 625, 631

[56] References Cited

U.S. PATENT DOCUMENTS

| | | | |
|---|---|---|---|
| 4,241,000 | 12/1980 | McCauley et al. | 264/65 |
| 4,481,300 | 11/1984 | Hartnett et al. | 501/904 |
| 4,520,116 | 5/1985 | Gentilman et al. | 501/904 |
| 4,686,070 | 8/1987 | Maguire et al. | 501/904 |
| 4,720,362 | 1/1988 | Gentilman et al. | 501/904 |
| 4,788,167 | 11/1988 | Mathers et al. | 501/153 |
| 4,957,886 | 9/1990 | Mathers et al. | 501/96 |
| 5,231,062 | 7/1993 | Mathers et al. | 501/96 |

FOREIGN PATENT DOCUMENTS

| | | |
|---|---|---|
| 0313443 | 4/1989 | European Pat. Off. . |
| 2556711 | 6/1985 | France . |
| 2643069 | 8/1990 | France . |

*Primary Examiner*—Michael Marcheschi
*Attorney, Agent, or Firm*—Burns, Doane, Swecker & Mathis, L.L.P.

[57] ABSTRACT

Gamma-aluminum oxynitride ground powders, white in color and well suited for conversion into optically transparent ceramic shaped articles, 100% of the particles of which being less than 10 μm in size and exhibiting a transmittance of at least 8%, are prepared by grinding particulate gamma-aluminum oxynitride agglomerates having a porosity of greater than 75%, such agglomerates themselves being produced by interreacting dry powdery admixture of aluminum nitride, alpha-alumina, and an alumina of high specific surface area or precursor thereof.

26 Claims, 2 Drawing Sheets

OPTICALLY TRANSPARENT GAMMA-ALUMINUM OXYNITRIDE POWDERS AND CERAMIC ARTICLES SHAPED THEREFROM

This application is a continuation of application Ser. No. 08/220,268, filed Mar. 30, 1994, now abandoned.

BACKGROUND OF THE INVENTION

1. Field of the Invention

The present invention relates to the preparation of ceramic powders of optically transparent gamma-aluminum oxynitride, and to the agglomerated or ground gamma-aluminum oxynitride powders thus obtained.

2. Description of the Prior Art

A number of processes for preparing gamma-aluminum oxynitride powders for the preparation of ceramics are known to this art.

Ishe-Shalom [Final Technical Report, Contract No. DAJA 48-84-009, 1986, European Research Office of the U.S. Army, London] and Rafaniello and Cutler [Am. Cer. Soc., 64, C-128 (1981)] describe such a process entailing the carbonitriding of alumina. This process comprises reaction in the presence of a controlled excess of alumina in order to obtain a mixture comprising alumina and aluminum nitride, this mixture subsequently being converted into gamma-aluminum oxynitride powder. The powder thus obtained contains residual carbon which imparts a greyish color thereto that is incompatible with the production of ceramics exhibiting good optical transparency.

U.S. Pat. No. 4,686,070 describes the carbonitriding of very pure gamma alumina to produce a mixture of alpha alumina and aluminum nitride. After heating, an agglomerated gamma-aluminum oxynitride powder is obtained. A grinding period of 16 hours and a screening stage are required to produce a gamma-aluminum oxynitride powder comprising particles having a diameter smaller than 37 µm.

FR-2,556,711 describes an intimate mixture of a very fine powder of alpha-alumina of very high purity and of an aluminum nitride powder whose particles are smaller than 20 µm in size. After heating, a gamma-aluminum oxynitride powder is obtained in the form of agglomerates. The particle size of the powder after grinding is smaller than 20 µm, and its mean diameter is equal to 6 µm.

U.S. Pat. No. 4,720,362 describes a process using a mixture containing from 30 mol % to 37 mol % of aluminum nitride and from 63 mol % to 70 mol % of alpha-alumina, both of high purity. After heating, this mixture is in the form of an agglomerated gamma-aluminum oxynitride powder requiring 72 hours of grinding to provide particles having a mean diameter equal to 1 µm.

It is known to this art that the optical transparency properties of ceramics based on gamma-aluminum oxynitride depend on the sinterability of the powder employed. Billy [Revue de Chimie Minérale, v. 22, pp. 473–483 (1985)] reports that the kinetics of sintering of the gamma-aluminum oxynitride powder vary as $1/r^2$, r representing the radius of the particles of the powder.

A very fine gamma-aluminum oxynitride powder for the production of optically transparent ceramics is thus a desideratum in this art.

With the different processes referred to above, such a fine powder is obtained by grinding the agglomerated gamma-aluminum oxynitride powder. Since this powder is very highly agglomerated, the grinding period is lengthy, on the order of about ten hours or even several tens of hours.

A lengthy grinding period presents two major disadvantages. On the one hand, it consumes energy and is therefore costly, and, on the other, it effects contamination of the powder by introducing therein materials abraded from the grinding mill, and this diminishes the optical properties of ceramics shaped therefrom.

SUMMARY OF THE INVENTION

Accordingly, a major object of the present invention is the provision of an improved process for the preparation of gamma-aluminum oxynitride powder which permits controlling the degree of agglomeration thereof and, therefore, makes it easier to grind.

Another object of this invention is the agglomerated or ground powder thus prepared and the production of optically transparent ceramics therefrom.

Briefly, the present invention features a process for the preparation of gamma-aluminum oxynitride powder, comprising reacting aluminum nitride with alpha-alumina and with an alumina of high specific surface or a precursor generating an alumina of high specific surface.

By "alumina of high specific surface" is intended any alumina exhibiting a specific surface higher than 10 m$^2$/g.

DETAILED DESCRIPTION OF BEST MODE AND PREFERRED EMBODIMENTS OF THE INVENTION

Figure 1:
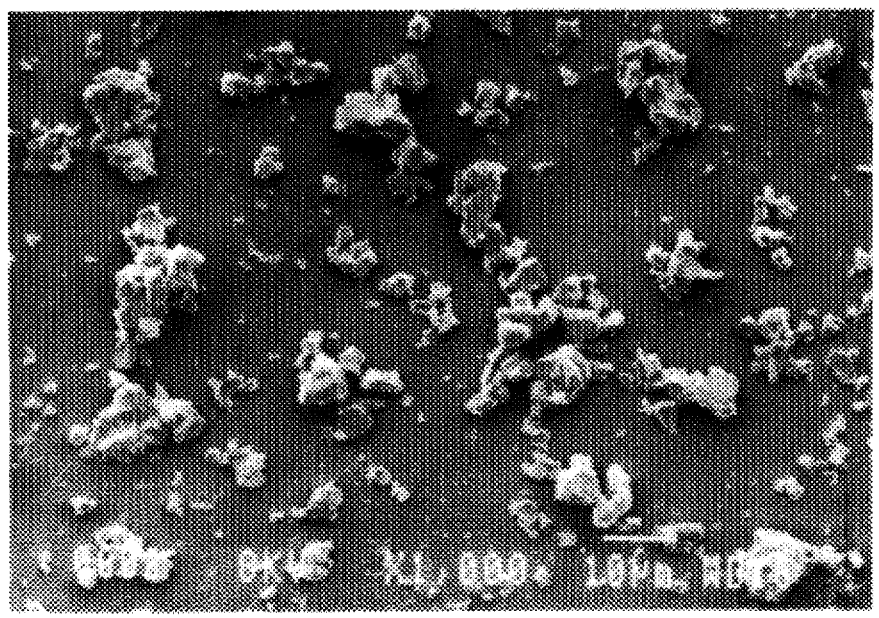
FIG. 1 is an electron photomicrograph of an agglomerated gamma-aluminum oxynitride powder according to the present invention.

More particularly according to the present invention, the aluminum nitride, the alpha-alumina and the alumina of high specific surface or precursor of such alumina are mixed, dried, and heated to a sufficient temperature to form a gamma-aluminum oxynitride powder, which powder is subsequently ground.

The aluminum nitride employed in the process of the invention is advantageously an aluminum nitride of high purity whose particles have a mean diameter smaller than 10 µm and preferably smaller than 5 µm. Preferably, an aluminum nitride is used in which the oxygen content is lower than 3% by weight and the concentration of metallic impurities therein does not exceed 5,000 ppm.

The alpha-alumina is an alpha-alumina exhibiting a purity of at least 99.5% by weight.

The alumina of high specific surface or the precursor generating such an alumina is selected from among amorphous or transition aluminas exhibiting a degree of purity on the same order as that of the alpha-alumina. By "precursor generating an alumina of high specific surface" is intended an aluminum hydroxide or aluminum salt capable of producing a alumina of high specific surface under the temperature and reaction conditions of the process according to the invention. Exemplary of such aluminum salts are the nitrate, the sulfate, the hydroxycarbonate, the alcoholates, the formate and the oxalate. Gamma-alumina is the preferred.

The alpha-alumina and the alumina of high specific surface or the precursor of such an alumina, are advantageously selected such that their mixture exhibits a specific surface ranging from 6 to 350 m$^2$/g and preferably from 10 to 260 m$^2$/g and an apparent density lower than 1 kg/dm$^3$ and preferably lower than 0.6 kg/dm$^3$.

Preferably employed is an amount of alpha-alumina of from 5% to 95% and more preferably from 25% to 85% by weight of the mixture of alpha-alumina and the alumina of high specific surface, or the precursor of such an alumina, said precursor being calculated as the alumina equivalent thereof.

The mixture of the alpha-alumina and the alumina of high specific surface or the precursor of such an alumina may advantageously be replaced by a transition alumina whose nonhomogeneous metamorphosis produces a mixture of alpha-alumina and of alumina of high specific surface. Partially calcined ex-alum alumina is exemplary thereof.

The mixture comprising aluminum nitride, alpha-alumina, and the alumina of high specific surface or precursor thereof advantageously comprises:

(i) from 16 to 40 mol % of aluminum nitride and preferably from 25 to 35% thereof, and (ii) from 60 to 84 mol % and preferably from 65 to 75% of the mixture of alpha-alumina and the alumina of high specific surface or the precursor of such an alumina.

The aforesaid mixing may be carried out in any type of apparatus and for such period of time to provide a homogeneous mixture. For example, in the case of a ball mixer, this period of time may range from 20 minutes to 20 hours.

Said mixing may be carried out dry or in the presence of an organic solvent devoid of trace amounts of water. Isopropanol and toluene are exemplary thereof.

The drying of the mixture is advantageously carried out under a dry gaseous atmosphere. Any type of gas or gas mixture which is dry and inert towards the different constituents of the mixture may be employed for this purpose. Nitrogen, argon, helium, xenon and air are exemplary thereof. Air is the preferred.

The drying may also be carried out under reduced pressure.

The drying is generally carried out at a temperature not exceeding 700° C. and for a sufficient period of time until the weight of the mixture is constant.

The drying may be conducted before the introduction into the reactor which is subsequently used for converting the mixture into gamma-aluminum oxynitride powder. The drying is preferably carried out within the reactor.

The reaction of conversion of said mixture into gamma-aluminum oxynitride powder is carried out in a reactor maintained under a stream of dry gas. This gas is generally selected from among nitrogen and gas mixtures containing nitrogen which do not contain any oxygen. Nitrogen or a gas mixture containing same is preferably employed, such that the partial pressure of nitrogen is at least 0.1 atm (10$^4$ Pa).

The reactor is generally made of a material which is inert vis-a-vis the dry gas, aluminum nitride and alumina. For example, boron or aluminum nitride in bulk form or as a coating on graphite, sintered alumina and silicon carbide are suitable such materials.

The heating of the reactor is generally conducted progressively up to a maximum temperature of from 1,650° to 1,900° C. and preferably from 1,700° to 1,800° C. This temperature is maintained for a sufficient period of time to permit the gamma-aluminum oxynitride powder to form. For example, this period of time may range from a few hours to a few tens of hours.

The flow rate of dry gas employed varies as a function of the partial pressure of the oxygen-containing gases which may even be formed during the reaction. In general, a gas flow rate less than 10 kPa and preferably less than 5 kPa is employed.

The grinding of the agglomerated gamma-aluminum oxynitride powder thus obtained may be carried out in any type of apparatus that is suitable for grinding powders. A mill is generally employed comprising an earthenware jar coated internally with polymer or elastomer, containing beads made of gamma-aluminum oxynitride or sintered alumina of sufficient purity as not to contaminate the powder thus produced. Polyurethane and polybutadiene are exemplary of such polymer or elastomer.

The grinding may be carried out dry or via wet process, for example, in the presence of water. Dry grinding is preferably employed.

The period of grinding time is sufficient to produce a ground gamma-aluminum oxynitride powder. By "ground powder" is intended a powder whose particle size is smaller than 10 μm.

The present invention also features the agglomerated gamma-aluminum oxynitride powder thus produced. Such powder is characterized in that the porosity of the agglomerate is greater than 75%.

This agglomerated powder is also characterized in that it has a carbon content lower than 300 ppm and in that it contains less than 2% by weight of aluminum nitride and less that 2% by weight of alumina.

The ground gamma-aluminum oxynitride powder of the invention is produced by grinding the agglomerated aluminum oxynitride powder, and is characterized in that 100% of the particles are smaller than 10 μm in size and in that it exhibits a transmittance of at least 8% measured at 2,500 cm$^{-1}$ on a KBr disc 0.9 mm in thickness containing 3.33% of gamma-aluminum oxynitride.

This ground powder is also characterized in that it has a carbon content lower than 300 ppm and in that it contains less than 2% by weight of aluminum nitride and less than 2% by weight of alumina.

The gamma-aluminum oxynitride powder is particularly useful for producing shaped articles made of polycrystalline ceramics which are transparent in the near ultraviolet, the visible and the infrared. Such ceramics are advantageously employed in the fields of military aeronautics and of lighting. Sighting windows for missiles and transparent housings for vapor lamps are also exemplary applications thereof.

In order to further illustrate the present invention and the advantages thereof, the following specific examples are given, it being understood that same are intended only as illustrative and in nowise limitative.

EXAMPLE 1

A mixture comprising 73 mol % of alumina powder and 27 mol % of aluminum nitride was formulated.

The alumina employed contained 75% by weight of alpha-alumina and 25% by weight gamma-alumina, had a purity of at least 99.98%, a specific surface of 25 m$^2$/g, an apparent density of 0.3 kg/dm$^3$, and the particles had a mean diameter equal to 0.45 μm (measured by Sedigraph particle size measurement). This alumina is marketed by Ba ïkowski under the trademark Baikalox® CR30. The aluminum nitride had a specific surface of 3.5 m$^2$/g, an oxygen content of 1% and the particles of which had a mean diameter of approximately 2 μm. This aluminum nitride is marketed by Elf Atochem under the trademark Pyrofine® A4.

The mixing of the alumina and aluminum nitride powders was carried out dry in an earthenware jar filled to approximately 40% with alumina beads for 17 hours on jar-rolls. The homogeneous mixture thus obtained was placed in a crucible made of alumina or boron nitride and then dried at 400° C. for 2 hours under dry air. The weight loss observed was equal to 0.75%.

The crucible was introduced into a furnace having a working capacity of 220 l, equipped with a lid and resistors made of graphite. The air present in the furnace was removed under vacuum at approximately 0.1 kPa, and nitrogen was then introduced at a flow rate of 1 m³/h. The temperature of the furnace was increased to 1,750° C. over 2 hours and then maintained for 17 hours. The CO content of the gas phase was measured using an URAS 7N infrared analyzer situated at the furnace outlet. This CO content did not exceed 1.7%.

The furnace was permitted to cool naturally to ambient temperature. The loss in weight of the charge was on average equal to 0.4%. The product obtained was an agglomerated gamma-aluminum oxynitride powder of white color, regardless of whether the crucible was made of alumina or boron nitride.

X-ray diffraction analysis of the powder evidenced no residual aluminum nitride and indicated an alumina content lower than 1%. The calculations proposed by Lejus [*Bull. Soc. Chim. France*, 11–12, p. 2123 (1962)] permitted an alumina content equivalent to 73.9 mol % to be determined. The carbon content, measured by high-temperature combustion, was lower than the limit of detection equal to 50 ppm.

The gamma-aluminum oxynitride powder obtained is shown in the photomicrograph of FIG. 1. It comprised angular crystals generally smaller than 10 µm in size. The porosity of the agglomerated block was deduced from the measurement of the apparent density. It was found that its porosity was equal to 83%.

A grinding test was carried out for 30 seconds using an oscillating disc mill. It was determined that 76% of the agglomerated powder had been ground and that the mean diameter of the ground fraction was equal to 3.2 µm (Sedigraph particle size measurement).

The infrared transmittance of the ground powder was measured by shaping a KBr disc 0.9 mm in thickness containing 3.33% by weight of ground gamma-aluminum oxynitride powder. The transmittance measured at 2,500 cm⁻¹ was equal to 20.3%, the standard deviation being 1.3.

The experimental results are reported in the following Table.

EXAMPLE 2

(Comparative):

The procedure of Example 1 was repeated, using an alumina containing less than 5% by weight of alpha-alumina and more than 95% by weight of gamma-alumina and which had a specific surface of 105 m²/g, an apparent density of 0.15 kg/dm³ and a mean particle diameter equal to 0.4 µm. This alumina is marketed under the trademark Baikalox® CR125.

Figure 2:
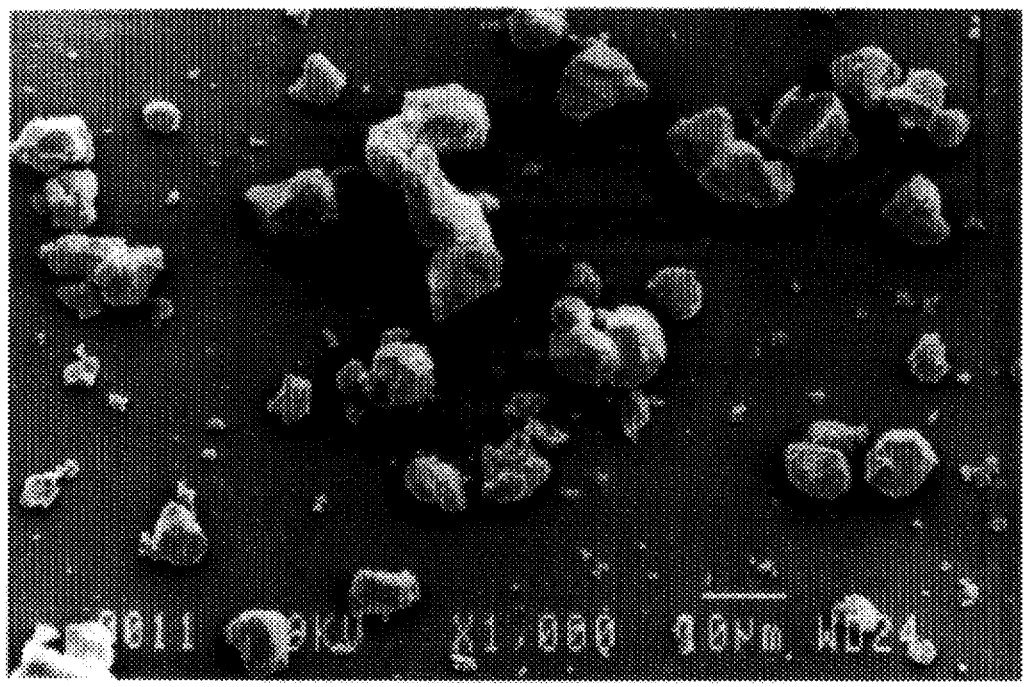
FIGS. 2 and 3 are electron photomicrographs of agglomerated gamma-aluminum oxynitride powders other than those according to this invention.

The reaction temperature was 1,800° C. The product obtained was in the form of a block of weakly agglomerated gamma-aluminum oxynitride powder whose porosity was 75%. This block disintegrated easily to provide a powder comprising solid grains of large size, generally ranging from 6 to 15 µm (see photomicrograph of FIG. 2). These solid grains were very difficult to grind.

The experimental results are also reported in the following Table.

EXAMPLE 3

(Comparative):

The procedure of Example 1 was repeated, in the presence of an alumina containing 95% by weight of alpha-alumina and 5% by weight of gamma-alumina and which had a specific surface of 6 m²/g, an apparent density of 0.55 kg/dm³ and a mean particle diameter of 0.6 µm. This alumina is marketed under the trademark Baikalox® CR6.

Figure 3:
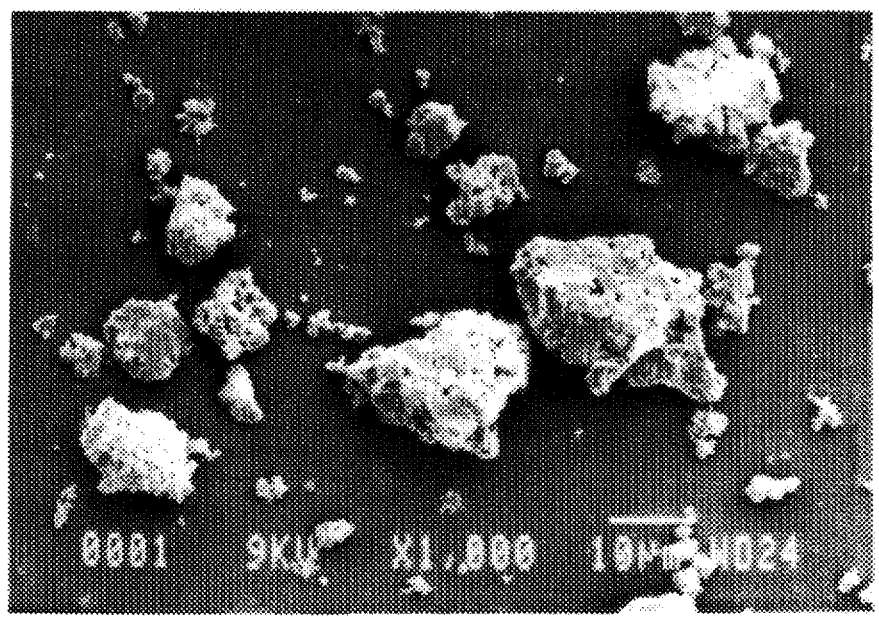

The reaction temperature was 1,700° C. The gamma-aluminum oxynitride powder recovered (see photomicrograph of FIG. 3) was in the form of agglomerates which were very difficult to grind, whose porosity was 54%.

The experimental results are also reported in the following Table.

TABLE

|  | EXAMPLE | | |
|---|---|---|---|
|  | 1 | 2 | 3 |
| Loss in Weight on Drying (%) | 0.75 | 3.5 | 0.3 |
| Loss in Weight after Heating (%) | 0.4 | 3.8 | 0.2 |
| Agglomerated Powder (Before Grinding) | | | |
| Color | White | White | White |
| Carbon Content (ppm) | <50 | <50 | <50 |
| Residual Alumina (%) | <1 | n.d. | <1 |
| Residual Aluminum Nitride (%) | n.d. | <1 | n.d. |
| Equivalent Alumina Content (mol %) | 73.9 | 73.0 | 72.9 |
| Porosity | 83 | 75 | 54 |
| Powder (After Grinding Test) | | | |
| Ground Fraction (%) | 76 | 100 | 53 |
| d75 (µm)* | 6.8 | 12 | 15 |
| Mean Diameter of the Ground Fraction (µm) | 3.2 | 8.6 | 2.5 | n.d.: not detected
*: 75% of the particles were of a size smaller than the value reported in the Table.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for the preparation of particulate gamma-aluminum oxynitride agglomerates, comprising reacting aluminum nitride with alpha-alumina, wherein the improvement comprises using a grinding facilitating amount of alumina of high specific surface area, or precursor thereof, in the reacting step to produce particulate gamma-aluminum oxynitride agglomerates suitable for conversion into optically transparent ceramic shaped articles.

2. A process as defined by claim 1, wherein (i) said aluminum nitride is present in an amount of from 16–40 mol % and (ii) the alpha-alumina and alumina of high specific surface area, or precursor thereof, are present in a combined amount of from 60–84 mol %.

3. The process as defined by claim 2, said alpha-alumina comprising from 5% to 95% by weight of said constituent (ii).

4. The process as defined by claim 1, said aluminum nitride comprising a high purity aluminum nitride having a mean particle size of less than 10 µm.

5. The process as defined by claim 4, said aluminum nitride having a mean particle size of less than 5 µm.

6. The process as defined by claim 4, said aluminum nitride having an oxygen content of less than 3% by weight and a concentration of metallic impurities not in excess of 5,000 ppm.

7. The process as defined by claim 1, said alpha-alumina having a purity of at least 99.5% by weight.

8. The process as defined by claim 2, said constituent (ii) having a specific surface area of from 6 to 350 m²/g and an apparent density of less than 1 kg/dm³.

9. The process as defined by claim 8, said constituent (ii) having a specific surface area of from 10 to 260 m²/g and an apparent density of less than 0.6 kg/dm³.

10. In a process for the preparation of a gamma-aluminum oxynitride ground powder, comprising interreacting a dry powdery admixture of aluminum nitride with alpha-alumina, wherein the improvement comprises using a grinding facilitating amount of alumina of high specific surface area or precursor thereof, in the admixture, and grinding the powder thus obtained, to produce gamma-aluminum oxynitride ground powder suitable for conversion into optically transparent ceramic shaped articles.

11. The process as defined by claim 10, comprising heating said powdery admixture, at a temperature less than 700° C., with a gas which comprises nitrogen, argon, helium, xenon or air.

12. The process as defined by claim 10, comprising interreacting said powdery admixture at a temperature ranging from 1,650° to 1,900° C.

13. The process as defined by claim 10, comprising interreacting said powdery admixture under an atmosphere of an inert dry gas.

14. The process as defined by claim 13, said dry gas comprising nitrogen or a nitrogen-containing gas devoid of oxygen values.

15. The particulate gamma-aluminum oxynitride agglomerates prepared by the process as defined by claim 1.

16. The gamma-aluminum oxynitride ground powder prepared by the process as defined by claim 10.

17. Particulate gamma-aluminum oxynitride agglomerates, white in color, having a porosity of greater than 75%.

18. The particulate gamma-aluminum oxynitride agglomerates as defined by claim 17, comprising a carbon content of less than 300 ppm, less than 2% by weight of aluminum nitride, and less than 2% by weight of alumina.

19. The particulate gamma-aluminum oxynitride agglomerates as defined by claim 18, having a morphology or angular crystals generally smaller than 10 µm in size.

20. Gamma-aluminum oxynitride ground powder, white in color, 100% of the particles of which being less than 10 µm in size and exhibiting a transmittance of at least 8% measured at 2,500 cm⁻¹ on a KBr disc 0.9 mm in thickness and containing 3.33% of gamma-aluminum oxynitride.

21. The gamma-aluminum oxynitride ground powder as defined by claim 20, comprising a carbon content of less than 300 ppm, less than 2% by weight of aluminum nitride, and less than 2% by weight of alumina.

22. An optically transparent ceramic shaped article comprising the particulate gamma-aluminum oxynitride agglomerates as defined by claim 17.

23. An optically transparent ceramic shaped article comprising the gamma-aluminum oxynitride ground powder as defined by claim 20.

24. The particulate gamma-aluminum oxynitride agglomerates as defined by claim 17, comprising angular crystals thereof.

25. The process as defined by claim 1, wherein said alumina of high specific surface area is different from said alpha-alumina.

26. The process as defined by claim 10, wherein said alumina of high specific surface area is different from said alpha-alumina.

* * * * *